United States Patent Office 2,831,895
Patented Apr. 22, 1958

2,831,895

PHENOLS FROM AROMATIC SULFONIC, SULFAMIC, AND SULFONE COMPOUNDS

Donna Stevens and Guy H. Harris, Concord, and Marshall B. Pearlman, Los Angeles, Calif., assignors to The Dow Chemical Company, Midland, Mich., a corporation of Delaware No Drawing. Application December 2, 1955
Serial No. 550,792

4 Claims. (Cl. 260—607)

This invention relates to a method of making phenolic compounds from certain aromatic sulfonic, sulfamic and sulfone compounds and from S-heterocyclic sulfones.

The fact that cupric compounds can aid in the conversion of aromatic carboxylic acids to phenols has been taught in the copending applications of R. D. Barnard and R. H. Meyer, Serial No. 403,074; W. W. Kaeding, R. O. Lindblom and R. G. Temple, Serial No. 403,064, now U. S. Patent No. 2,727,926; M. B. Pearlman, Serial No. 403,049, now U. S. Patent No. 2,727,924; and M. B. Pearlman, Serial No. 403,050, now U. S. Patent No. 2,764,587, all filed on January 9, 1954.

The present invention is based on the discovery that phenolic compounds can be produced from aromatic sulfonic acids, sulfonates, sulfonamides and sulfones and from S-heterocyclic sulfones by reaction with cupric compounds in the presence of water. More specifically, it has been found that water-soluble cupric salts react in the presence of water with such sulfur compounds at temperatures of at least 200° C., but which need not exceed 400° C., to form phenols, provided the sulfur compound has at least one unsubstituted position on the nucleus adjacent to the point of attachment of the sulfur containing group.

Examples of sulfur compounds useful in the present process include:

Benzene sulfonic acid
o-, m- and p-Toluene sulfonic acid
o-, m- and p-Chlorobenzene sulfonic acid
o-, m- and p-Sulfobenzoic acids
Salts and esters of the foregoing:
    Benzene sulfonamide
    o-, m- and p-Toluene sulfonamide
    2-naphthalene sulfonamide
    Phenylsulfonyl benzene
    o-, m- and p-Chlorophenyl sulfonyl benzene
    Dibenzothiophene dioxide
    Phenyl methyl sulfone
    Tolyl butyl sulfone According to the invention, any such compound containing hexavalent sulfur in

form, in a heterocyclic compound or attached to an aromatic nucleus, is heated to a reaction temperature in the range from 200° to 400° C. in contact with water or water vapor and a cupric salt. The extent of the reaction, in batch operation, depends upon the contact time and temperature employed and the amount of cupric salt present at any time relative to the amount of the sulfur compound in contact therewith. For substantially complete batch conversion to phenolic compounds, there should be at least one mol of cupric salt for each mol of the sulfur compound in the reaction zone at any time. Lesser proportions of cupric salt may be used, but the conversion to phenols will not be complete. The reaction is usually accompanied by the formation of metallic copper unless the copper compound is restored occasionally to the cupric condition by introduction of gaseous oxygen. Such a procedure readily lends itself to prolonged or continuous operation and, in such a case, the ratio of cupric salt to sulfur compound becomes unimportant because the copper compound can be restored to the useful cupric state as soon as it is reduced and in the course of time, has an infinite capacity for converting the sulfur compounds to phenols.

Upon termination of the reaction, the phenolic compounds may be recovered by extraction or steam distillation from the reaction mixture. In the case of continuous operation, the recovery procedure is applied repeatedly or continuously throughout the process.

The cupric compound employed may be the cupric salt of a strong mineral acid, such as cupric sulfate or chloride, or it may be a cupric salt of an organic acid. It is most conveniently and economically supplied initially as cupric sulfate or other salt which is soluble in water.

Tests have shown cupric salts to be unique in their effect on the conversion of the aromatic sulfur compounds to phenols, since the salts of aluminum, cadmium, cobalt, chromium, iron, lead, manganese, mercury, potassium, silver, tin and zinc produce no such effect. It has also been found that the effect of the cupric compound is augmented by the presence of a salt or oxide (hydroxide) of lithium, sodium, potassium, magnesium, barium or cobalt, but that these agents have no effect unless the cupric compound is present.

In the following examples, the identified sulfur compound was sealed in a glass tube with the indicated molar proportion of cupric sulfate and with from 10 to 20 times its weight of water. The tube was heated to the indicated temperature for from 1 to 2 hours, then was cooled, opened, and emptied. The products were recovered by extraction or by steam distillation, and were identified.

Examples

| Sulfur Compound | Moles | Moles CuSO$_4$ | Temp., ° C. | Products |
|---|---|---|---|---|
| p-Toluene sulfonic acid. | 1 | 1 | 240 | m-cresol. |
| p-Toluene sulfonamide. | 1 | 1 | 240 | Do. |
| m-Toluene sulfonamide. | 1 | 1 | 240 | o- and p-cresol. |
| Sodium m-sulfobenzoate. | 1 | 2 | 240 | Phenol, resorcinol. |
| Phenyl sulfonyl benzene. | 1 | 1 | 240 | o- and p-phenyl sulfonyl phenol. |
| p-Chlorobenzene sulfonamide. | 1 | 1 | 240 | phenol, resorcinol. |
| 2-Naphthalene sulfonamide. | 1 | 1 | 240 | 2-naphthol. |
| Dibenzothiophene dioxide. | 1 | 1 | 240 | 1-hydroxy dibenzothiophene dioxide. |

With the sulfonic and sulfamic compounds, in which sulfur is attached as a substituent on an aromatic nucleus, the sulfur containing group is removed under the reaction conditions, and a hydroxyl group appears in the product in a position adjacent to the former point of attachment of the sulfonic or sulfamic group. With heterocyclic compounds containing the sulfur atom as part of a ring and with sulfones, such as phenyl sulfonyl benzene, the sulfur containing group is retained but a hydroxyl group is acquired in one of the ortho or para positions. When the compound being treated contains a carboxyl group with an adjacent replaceable hydrogen, as in the sulfobenzoates, both groups are removed and hydroxyls appear in positions adjacent to the points of attachment of the carboxyl and the sulfur containing group. When the compound contains a chlorine or bromine atom attached to the benzene ring, the halogen is commonly replaced by hydrogen or hydroxyl, during the reaction.

It is possible to carry out the reaction at atmospheric pressure in those cases in which the sulfur compound is a liquid which has a boiling point above 200° C. In such a case, it is convenient to mix the sulfur compound with the cupric salt, heat the mixture to a reaction temperature, and pass steam, or steam and air through the mixture. More commonly, however, the sulfur compound, cupric salt and water are heated under sufficient superatmospheric pressure to keep at least part of the water in the liquid state.

We claim:

1. The method which comprises heating a sulfur compound from the class consisting of the aromatic sulfonic acids, sulfonates, sulfonamides and sulfones and the aromatic S-heterocyclic sulfones wherein the aromatic ring is fused to the heterocyclic ring in contact with a water-soluble cupric salt and water, the cupric salt being selected from the class consisting of the sulfate and chloride, to a temperature from 200° C. to 400° C., said sulfur compound having at least one unsubstituted position on the nucleus adjacent to the point of attachment of the hexavalent sulfur atom, thereby to produce a phenolic compound having a hydroxyl group in a position adjacent to that originally occupied by the sulfur containing group, the latter group being removed during the reaction in the case of sulfonic and sulfonamide compounds, and being retained in the case of the sulfones.

2. The method claimed in claim 1, wherein the hexavalent sulfur atom is attached to a tolyl group in the para position, and the phenol produced is meta-cresol.

3. The method claimed in claim 1, wherein the hexavalent sulfur atom is attached to a tolyl group in the meta position, and the phenolic product is a mixture of ortho- and para-cresols.

4. The method claimed in claim 1, wherein the sulfur compound is a phenyl sulfone, and the phenol produced is a hydroxyphenyl sulfone.

No references cited.